United States Patent

Walker et al.

[11] Patent Number: 6,112,185
[45] Date of Patent: *Aug. 29, 2000

[54] AUTOMATED SERVICE UPGRADE OFFER ACCEPTANCE SYSTEM

[75] Inventors: Jay S. Walker, Ridgefield; Sanjay K. Jindal, Wilton, both of Conn.

[73] Assignee: Walker Digital, LLC, Stamford, Conn.

[*] Notice: This patent issued on a continued prosecution application filed under 37 CFR 1.53(d), and is subject to the twenty year patent term provisions of 35 U.S.C. 154(a)(2).

[21] Appl. No.: 08/885,570

[22] Filed: Jun. 30, 1997

[51] Int. Cl.⁷ .................................................. G06F 19/00
[52] U.S. Cl. ...................................................... 705/5; 705/6
[58] Field of Search ............................. 705/5, 6, 13, 15; 340/825.28, 825.29

[56] References Cited

U.S. PATENT DOCUMENTS

| | | | |
|---|---|---|---|
| 4,752,876 | 6/1988 | Couch et al. | 705/5 |
| 4,845,625 | 7/1989 | Stannard . | |
| 5,237,499 | 8/1993 | Garback . | |
| 5,253,166 | 10/1993 | Dettlebach et al. | 705/5 |
| 5,255,184 | 10/1993 | Hornick et al. | 705/6 |
| 5,285,383 | 2/1994 | Lindsey et al. . | |
| 5,311,425 | 5/1994 | Inada | 705/6 |
| 5,404,291 | 4/1995 | Kerr et al. | 705/5 |
| 5,732,398 | 3/1998 | Tagawa | 705/5 |
| 5,797,126 | 8/1998 | Helbling et al. | 705/5 |

OTHER PUBLICATIONS

D'Ambrosio, Richard "Keep Alert For Ways To Upgrade At Discount" Business and Travel News n 202, 26 Apr. 1991.
WebFlyer FAQ Webpage (http://www.webflyer.com/@faq/upgrade.htm#upgrade1 Dec.1998.
Carol Smith, "LAX; Getting Out; The Art of the Upgrade", Los Angeles Times, Nov. 15, 1995 at p. 14.
"TravelBids"(http://www.travelbids.com), download date; Mar. 31, 1997.
"Cathay Pacific CyberTraveler Auctions" (http://www.cathay–usa.com/auction), download date: Apr. 4, 1997.
"American Airlines' Silent AAuction" (http:///www2.amrcorp.com/auction/rules.html), download date: Apr. 7, 1998.

*Primary Examiner*—Eric W. Stamber
*Assistant Examiner*—Penny Caudle
*Attorney, Agent, or Firm*—Peter J. Vogel; Dean Alderucci

[57] ABSTRACT

An automated service upgrade offer acceptance system is provided for receiving (i) reservations for a selected category of assigned services, such as seating, and (ii) offers for upgraded services, such as an upgrade of an initially selected category of seating to a preferred seating category, from confirmed customers. The automated service upgrade acceptance system permits customers to submit offers for a number of upgraded services or upgrade offer items, including offers for an upgrade of an initial category of seating to a different seating category, including premium seats within a given category of seating, as well as other premium services, such as priority for special meals or drinks, priority for receipt of luggage upon deplaning, and discount companion tickets. The automated service upgrade acceptance system allows a customer to place a binding offer for an upgraded offer item, should the item become available. Offers for upgraded services can be accepted by the automated service upgrade acceptance system at any time during a seller-defined offer acceptance period, from the time of making a reservation, up to a predefined expiration period. The automated service upgrade acceptance system processes the received offers for upgraded services, at one or more intervals until an offer acceptance period expires, to determine whether to accept or reject each offer for an upgraded service and thereafter notify the customers of any revised seating assignments. The received offers for each different upgrade offer item are preferably processed in a predefined sequence, such that offers for the highest categories of seating are processed first. The automated service upgrade acceptance system can enhance the value of offers in accordance with seller-defined criteria for preferred customers, such as frequent flyers, or in accordance with a promotional offer.

84 Claims, 11 Drawing Sheets

| FLIGHT NUMBER 440 | FLIGHT DATE 445 | AIRCRAFT TYPE 450 | SEAT NUMBER 455 | SEAT CLASS 460 | SEAT DESCRIPTOR 465 |
|---|---|---|---|---|---|
| 1458 | 01/01/97 | DC9 | 01 | FIRST CLASS | WINDOW |
| 1458 | 01/01/97 | DC9 | 10 | FIRST CLASS | AISLE |
| 1522 | 02/02/97 | 747 | 200 | BUSINESS | AISLE |
| 1002 | 02/15/97 | 747 | 175 | BUSINESS | AISLE |
| 1002 | 02/15/97 | 747 | 206 | COACH | AISLE/ FIRST 5 ROWS |

| FLIGHT NUMBER 630 | FLIGHT DATE 635 | CUSTOMER NAME 640 | CUSTOMER ADDRESS 645 | RESERVATION NUMBER 650 | OFFER AMOUNT 655 | UPGRADE OFFER ITEM(S) 660 | SEAT PREFERENCE 665 |
|---|---|---|---|---|---|---|---|
| 1458 | 01/01/97 | JOE SMITH | 44 MAIN ST. ANYTOWN, CT | 16752 | $25 | BUSINESS CLASS; BEVERAGE UPON BOARDING | WINDOW |
| 1458 | 01/01/97 | BILL WARREN | 88 FIRST ST. PLACE, NY | 24387 | $20 | FIRST CLASS, PRIORITY LUGGAGE | AISLE |
| 1522 | 01/01/97 | SUE JOHNSON | 23 RIVER DR. MONROE, NJ | 63095 | $15 | COACH; FIRST 5 ROWS | AISLE |

| OFFER RULE NUMBER 752 | FLIGHT NUMBER 755 | DATE 760 | TIME 765 | CURRENT CUSTOMER FARE CLASS 770 | UPGRADE OFFER ITEM 775 | MINIMUM OFFER 780 |
|---|---|---|---|---|---|---|
| 1046 | 123456 | 01/01/97 | 12:30 PM | BUSINESS CLASS | FIRST CLASS | $200 |
| 1047 | 123456 | 01/01/97 | 12:30 PM | FULL FARE | FIRST CLASS | $450 |
| 1048 | 123456 | 01/01/97 | 12:30 PM | DISCOUNTED FARE | FIRST CLASS | $500 |
| 1049 | 123456 | 01/01/97 | 12:30 PM | FULL FARE | BUSINESS CLASS | $100 |
| 1050 | 123456 | 01/01/97 | 12:30 PM | DISCOUNTED FARE | BUSINESS CLASS | $200 |
| 1051 | 123456 | 01/01/97 | 12:30 PM | FULL FARE | ROW 1 COACH | $175 |
| 1052 | 123456 | 01/01/97 | 12:30 PM | FULL FARE | ROW 2 COACH | $150 |
| 1053 | 123456 | 01/01/97 | 12:30 PM | FULL FARE | ROWS 3-5 COACH | $125 |
| 1054 | 123456 | 01/01/97 | 12:30 PM | DISCOUNTED FARE | BULKHEAD COACH | $125 |
| 1055 | 123456 | 01/01/97 | 12:30 PM | DISCOUNTED FARE | PREMIUM SERVICES | $150 |

FIG. 7

AUTOMATED SERVICE UPGRADE OFFER ACCEPTANCE SYSTEM

FIELD OF THE INVENTION

The present invention relates generally to a system for processing reservations for a selected category of assigned service, such as seating on an aircraft, and, more particularly, to a system for automatically processing offers for upgraded services, such as seat upgrades, from customers having a confirmed reservation for an initial category of service.

BACKGROUND OF THE INVENTION

Although airlines are typically multi-billion dollar companies, their financial results are remarkably volatile. The major airlines typically fly thousands of flights each day, serving hundreds of thousands of customers. Nonetheless, the difference between profit and loss for a given airline, when viewed on a per-flight basis, can be the result of the smallest of differences. Further, the impact of a small per-flight difference is magnified by the high profit margin derived from each incremental dollar of value. For example, if an airline flies 5,000 flights a day, and each flight generated just $200.00 more in revenue, which is approximately equal to the revenue generated from just one leisure passenger, the resulting revenue would be $1,000,000.00 a day, almost all of which would be net profit.

Generally, when a flight is first added to an airline's schedule, the airline's revenue management system attempts to maximize revenue for the flight by establishing several fare classes and then allocating the number of seats and fare assigned to each fare class, based on forecasted demand. The revenue management system will thereafter continue to monitor the actual demand within each fare class relative to forecasted demand, to dynamically reevaluate the inventory allocation and pricing of each fare class for a given flight. In this manner, the airlines attempt to fly each aircraft as full as possible without allowing earlier-booking discount-fare passengers to displace later-booking full-fare passengers. Invariably, however, forecasting errors and other factors lead to excess capacity on most flights.

Typically, the difference in published fares between a coach-class ticket and a premium-class ticket for the same flight can be quite substantial. This is especially true when the cost of a premium-class ticket is compared to the cost of discounted leisure tickets. Although many passengers would pay a one hundred percent (100%) surcharge for a premium-class seat, most passengers would not pay a three hundred percent (300%) surcharge for such a seat. Thus, on a given flight, there are a number of passengers who are willing to pay a premium, albeit generally discounted from the published fare, for an upgraded seat.

Airlines recognize that there is a large source of incremental revenue that may be obtained from existing passengers willing to purchase upgraded tickets for available premium-class seats at a favorable price. There is currently no effective way, however, for an airline to receive an offer from a customer for an upgraded seat or other premium service at a particular price set by the customer, below the airline's published fare. Thus, due primarily to operational concerns, airlines are not maximizing their at-the-gate revenue opportunities for highly valued perishable services, such as available premium seats. Specifically, the airlines want to keep the gate area for boarding flights as simple and fluid as possible. Thus, airlines are unwilling to place complex or judgment-based systems at the gate, which can delay flights, frustrate passengers and increase anxiety of operating personnel who are already under significant time pressure to get the flight boarded and pushed back from the gate.

In addition, there is currently no effective way for the airline to be confident that if the airline accepts the customer's offer, the customer will book the upgraded ticket without using the information to ascertain the airline's underlying level of price flexibility, which, if known to an airline's competitors or customers, could dramatically impact the airline's overall revenue structure. Thus, airlines typically provide upgraded seats to preferred customers, such as frequent flyers, for free or in exchange for upgrade coupons purchased by such customers in advance, or allow available premium-class seats to fly empty.

Several airlines utilize online systems to auction airline tickets. Cathay Pacific, for example, provides the Cyber Traveler Auction, which is a silent auction where the highest bidder wins. The Cyber Traveler Auction specifies the number and class of seats being auctioned at a given time, and indicates the corresponding origin and destination cities, and acceptable travel periods or blackout dates and days, as well as bid information, such as minimum and maximum bids, and acceptable bid increments. The number of bids received per class per day are displayed, as well as other bid statistics, but the individual bid amounts are not made available to other bidders. While the Cyber Traveler Auction provides a system for accepting offers for assigned seating, the offers are for an initial reserved seat, and do not permit the airline to obtain incremental revenue from existing confirmed passengers by receiving offers for upgraded services, such as a premium-class seat.

As apparent from the above-described deficiencies with conventional systems for processing reservations for a selected category of assigned services, such as seating on an aircraft, a need exists for a system which permits an individual having a reservation to place a binding offer for an upgraded service or upgrade offer item, should the item become available. A further need exists for a system that permits airlines to gain incremental revenue from the sale of seat upgrades on flights having excess inventory at a price that is set by the customer and agreed to by the seller. A further need exists for a buyer-driven system that permits a seller to sell upgraded services to individuals having a reservation at a price set by the customer, typically below the seller's published price. Yet another need exists for a system that permits sellers to stimulate sales of excess upgraded inventory, without compromising the seller's published fare structure. Another need exists for a system that permits sellers to capture and process consumer demand for each selling price of a given upgrade item, such as a given fare class on each airline flight.

SUMMARY OF THE INVENTION

Generally, according to one aspect of the invention, an automated service upgrade offer acceptance system is provided for receiving (i) reservations for a selected category of assigned service and (ii) offers for upgraded or changed services, such as an upgrade of an initially selected category of seating to a preferred seating category, from confirmed customers. In the illustrative airline embodiment, the reservations are for an assigned seat on a specified flight offered by an airline. The present invention can also be applied to other services such as car washing and dry cleaning, as well as other services having assigned seating within different categories of seats, such as theatre, stadium and other venue events.

The automated service upgrade acceptance system preferably includes an airline central controller, which receives offer acceptance rules from an airline's revenue management system which are then used to process and evaluate the received offers to determine whether to accept or reject a particular offer at a time of evaluation for an upgraded service. Once the offers for upgraded services are processed, the airline central controller notifies a check-in controller of any revised seating or service assignments, that result from accepted offers.

According to one aspect of the invention, the automated service upgrade acceptance system permits customers to submit offers for a number of upgraded services or upgrade offer items, including offers for an upgrade of an initial category of seating to a different seating category, as previously indicated, including premium seats within a given category of seating, such as bulkhead or emergency aisle seats offering more leg room, aisle seats providing easy deplaning near the front of an aircraft or a seat next to an empty seat, as well as other premium services, such as priority for special meals or drinks, priority for receipt of luggage upon deplaning, and discounted companion tickets, if available. It is noted that a customer can submit an offer for an upgraded seat assignment for individual legs of a multiple-leg itinerary. In this manner, the automated service upgrade acceptance system allows a customer to place a binding offer for an upgraded offer item, should the item become available. In a variation of the present invention, the upgrade offer items include a reverse bid or offer, whereby a customer submits an offer to give up a seat in case of overbooking.

According to another aspect of the invention, offers for upgraded services can be accepted by the automated service upgrade acceptance system at any time during a seller-defined offer acceptance period, from the time of making a reservation, up to a predefined expiration period. Once the offer acceptance period has expired, the automated service upgrade acceptance system processes any pending offers for upgraded services to determine whether to accept or reject each pending offer for an upgraded service and thereafter notify the customers of any revised seating assignments. In addition, the automated service upgrade acceptance system can preferably process received offers during the offer acceptance period as well, to determine whether to accept, reject, or hold each offer for an upgraded service at a given time during the offer acceptance period.

The received offers for each different upgrade offer item are preferably processed in a predefined sequence, such that offers for the highest categories of services, such as seating, are processed first. In this manner, seats in subsequent categories of seating will thus likely become available in sequence for further reassignment. The automated service upgrade acceptance system can implement various seller-defined criteria or offer acceptance rules for accepting offers for upgraded services. In the illustrative embodiment, an airline accepts the highest offers for each item, to the extent of availability, provided that the offers exceed a seller-defined minimum price.

In alternate embodiments, the automated service upgrade acceptance system can enhance the value of offers in accordance with seller-defined criteria for preferred customers, such as frequent flyers, or in accordance with a promotional offer.

The offer acceptance rules are preferably generated by the revenue management system (RMS) of the respective airline. As previously indicated, the illustrative offer acceptance rules accept the highest offers for each upgrade offer item, to the extent of availability, provided that each offer exceeds a seller-defined minimum price. The seller-defined minimum price may be revealed to a customer prior to accepting an offer for one or more upgraded services, at the discretion of the airline. In addition, the automated service upgrade acceptance system may optionally reject an offer for an upgraded service at the time the offer is submitted, if the offer fails to meet the predefined minimum price. The revenue management system preferably employs an offer acceptance process to generate acceptance rules by evaluating current inventory, pricing and revenue information, as well as historical patterns and external events, to forecast future travel.

A more complete understanding of the present invention, as well as further features and advantages of the present invention, will be obtained by reference to the following detailed description and drawings.

BRIEF DESCRIPTION OF THE DRAWINGS

FIG. 4 illustrates a sample table from the flight inventory database of FIG. 2;

FIG. 6 illustrates a sample table from the upgrade offer database of FIG. 2;

FIG. 7 illustrates a sample table from the offer rules database of FIG. 2;

DETAILED DESCRIPTION

Figure 1:
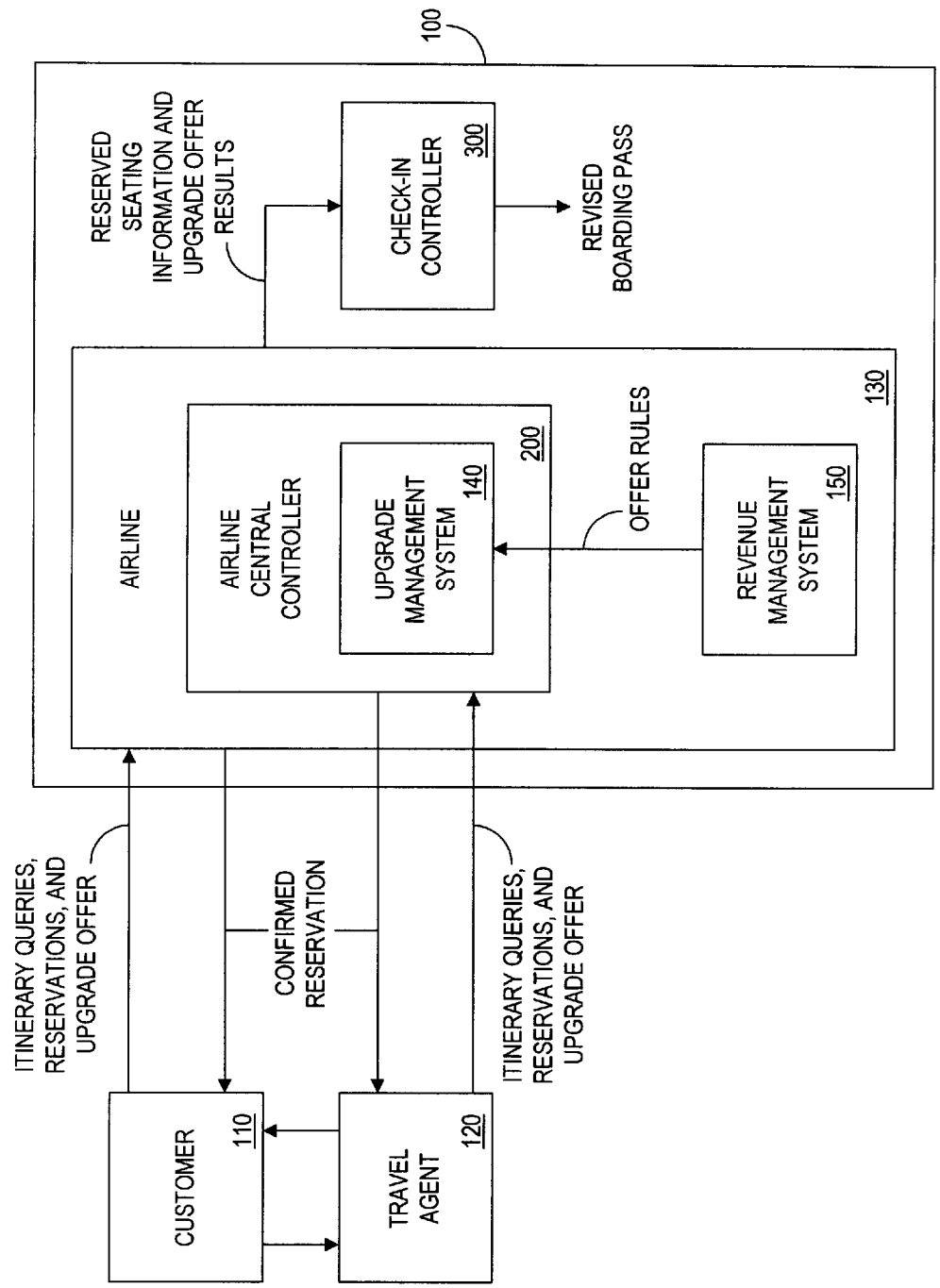
FIG. 1 is a schematic block diagram illustrating an automated service upgrade offer acceptance system in accordance with one embodiment of the present invention.

FIG. 1 shows an automated service upgrade offer acceptance system 100 for receiving (i) reservations for a selected category of assigned service and (ii) offers for upgraded services, such as an upgrade or change of an initially selected category of seating to a preferred seating category, directly from one or more customers 110, or indirectly by means of a travel agent 120 or another third party, such as a consolidator. In the illustrative airline embodiment, the reservations are for an assigned seat on a specified flight offered by an airline 130. It is noted that the present invention can also be applied for other services such as car washing and dry cleaning as well as other services having assigned seating within different categories of seats, such as theatre, stadium and other venue events.

The automated service upgrade acceptance system 100 includes an airline central controller 200, discussed below in conjunction with FIG. 2, which receives offer rules from a revenue management system 150 which are then processed by an upgrade management system 140 to evaluate the received offers to determine whether to accept or reject a particular offer at a time of evaluation for an upgraded service. Once the airline central controller 200 has processed each of the offers for upgraded services, the airline central controller 200 notifies a check-in controller 300, discussed below in conjunction with FIG. 3, of any revised seating assignments which results from accepted offers.

According to a feature of the present invention, the automated service upgrade acceptance system 100 permits customers 110 to submit offers for a number of upgraded services or upgrade offer items, including offers for an upgrade of an initial category of seating to a different seating category, as previously indicated, including premium seats within a given category of seating, such as bulkhead or emergency aisle seats offering more leg room, aisle seats providing easy deplaning near the front of an aircraft or a seat next to an empty seat, as well as other premium services, such as priority for special meals or drinks, priority for receipt of luggage upon deplaning, and discounted companion tickets, if available. It is noted that a customer 110 can submit an offer for an upgraded seat assignment for individual legs of a multiple-leg itinerary. In this manner, the automated service upgrade acceptance system 100 allows a customer 110 to place a binding offer for an upgraded offer item, should the item become available.

In a variation of the present invention, the upgrade offer items include a reverse bid or offer, whereby a customer 110 submits an offer to give up a seat in case of overbooking. In this manner, customers 110 submit an offer for an amount they would be willing to accept from the airline 130 if the customer 110 is denied boarding or "gets bumped" from a specified flight. In this embodiment, the customers 110 submitting the lowest offers win. It is noted that one reason that an airline 130 cannot overbook flights more than they already do, is the high cost of involuntary denials if too many passengers show up. Typically, the cost of bumping a passenger is a free ticket for each "volunteer." Instead, the automated service upgrade acceptance system 100 permits an airline 130 to offer a customer 110 an instant rebate, at the time of making a reservation, if the customer 110 agrees at the time of ticketing to take the next available flight if the reserved flight turns out to be full. In addition to the instant rebate, which is applied to the reserved seat, the customer 110 could also be awarded a discount certificate for future travel in a previously agreed upon amount, if the customer 110 is in fact denied boarding at flight time. With the present invention, an airline 130 can now evaluate the cost of overbooking a flight, as defined by the reverse offers, before accepting a reservation that exceeds the capacity of a plane.

According to a further feature of the invention, offers for upgraded services can preferably be accepted by the automated service upgrade acceptance system 100 at any time during a seller-defined offer acceptance period, from the time of making a reservation, up to a predefined period before the scheduled boarding of a given flight. In addition, an airline 130 can even permit seat reassignments after passengers have boarded the plane. Once the offer acceptance period has expired, the automated service upgrade acceptance system 100 processes any pending offers for upgraded services to determine whether to accept or reject each pending offer for an upgraded service and thereafter notify the check-in controller 300 of revised seating assignments. In addition, the automated service upgrade acceptance system can preferably process received offers during the offer acceptance period as well, for example at periodic intervals, to determine whether to accept, reject, or hold each offer for an upgraded service at a given time during the offer acceptance period. In this manner, customers can be notified upon check-in of whether an accepted offer has resulted in a seating reassignment.

In a preferred embodiment, the received offers for each different upgrade offer item are processed in a predefined sequence, such that offers for the highest categories of services are processed first. In this manner, seats in subsequent categories of seating will thus become available in sequence for further reassignment. It is noted that offers for upgraded services are preferably not processed in real-time, at the time a customer 110 makes a reservation, primarily because real-time processing would compromise the published fare structure of the airlines, and permit customers 110 to attempt to get a discounted seat upgrade before paying the published fare.

According to a further feature of the invention, the automated service upgrade acceptance system 100 can implement various seller-defined criteria or offer acceptance rules for accepting offers for upgraded services. For example, an airline 130 can accept the highest offers for each item, to the extent of availability. In the illustrative embodiment, the airline 130 accepts the highest offers for each item, to the extent of availability, provided that the offers exceed a seller-defined minimum price. In alternate embodiments, the automated service upgrade acceptance system 100 can enhance the value of offers in accordance with seller-defined criteria for preferred customers, such as frequent flyers, or in accordance with a promotional offer. For example, elite frequent flyers can be ranked based on twice the amount of the actual offer submitted by the customer 110. In addition, the seller-defined criteria can factor in the difference in cost of the original ticket purchased by a customer 100 and the amount of the offer. For example, the minimum offer for a first class seat on a given flight could be based on each passenger's fare differential. A passenger who has paid $200.00 for his ticket might be required to bid at least $150.00 for a first class seat, whereas a passenger who has paid $300.00 might be allowed to bid as low as $50.00.

As previously indicated, the automated service upgrade offer acceptance system 100 preferably receives (i) reservations for a selected category of assigned service and (ii) offers for upgraded services. It is noted, however, that a reservation may be submitted by the customer 110 to one party, such as an airline 130, and the offer for an upgraded service can subsequently be submitted by the customer 110 to another party, such as a consolidator. For example, a customer 110 having a confirmed reservation on a given flight can approach the consolidator or another third party to make an offer for an upgraded service, or the consolidator or another third party can obtain a listing of the confirmed passengers for a given flight or otherwise solicit offers for upgraded services. The evaluation process for such offers could be conducted by the third party, an airline or another processor.

In a preferred embodiment, the offer acceptance rules are generated by the revenue management system (RMS) 150 of the respective airline 130. The RMS 150 may be embodied as a conventional RMS, as modified herein to generate offer acceptance rules. Generally, revenue management systems (RMSs) 150 are utilized to optimize revenue per flight, in a known manner. An RMS performs seat inventory control by periodically adjusting nested booking limits ("buckets") for the various fare classes, in order to optimize the passenger mix and thereby maximize the generated revenue. In alternate embodiments, the offer acceptance rules may be generated manually, or by a yield management system, a profit management system, or any system that controls and manages inventory. As previously indicated, the illustrative offer acceptance rules accept the highest offers for each upgrade offer item, to the extent of availability, provided that each offer exceeds a seller-defined minimum price.

It is noted that the seller-defined minimum price may be revealed to a customer 110 prior to accepting an offer for one or more upgraded services, at the discretion of the airline 130. In addition, the automated service upgrade acceptance system 100 may optionally reject an offer for an upgraded service at the time the offer is submitted, if the offer fails to meet the predefined minimum price. The revenue management system 150 preferably employs an offer acceptance rules process to generate acceptance rules by evaluating current inventory, pricing and revenue information, as well as historical patterns and external events, to forecast future travel.

In one embodiment, the passenger can be charged an administrative fee for the privilege to place an offer for upgraded services, whether or not the offer is accepted. It is noted that such administrative fees cover the administrative cost of processing the bids and also discourage frivolous bids. An administrative fee as low as $5.00 per bid, for example, ensures that the airline 130 earns incremental revenues just from the administrative fees. In addition, to encourage the submission of early offers for upgraded services, the administrative fee can be waived or reduced if submitted at the time the reservation is initially made by the customer 110.

As discussed further below, each customer 110 contacts the airline 130, for example, by means of telephone, facsimile, online access, e-mail, in-person contact or through a third party, such as a travel agent 120 or a consolidator, and provides the automated service upgrade acceptance system 100 with a reservation and the terms of their offer for an upgraded service. It is noted that each customer 110 or travel agent 120 may employ a general-purpose computer for communicating with the automated service upgrade acceptance system 100. The general-purpose computer of each customer 110 and travel agent 120 is preferably comprised of a processing unit, a modem, memory means and any software required to communicate with the automated service upgrade acceptance system 100.

Figure 2:
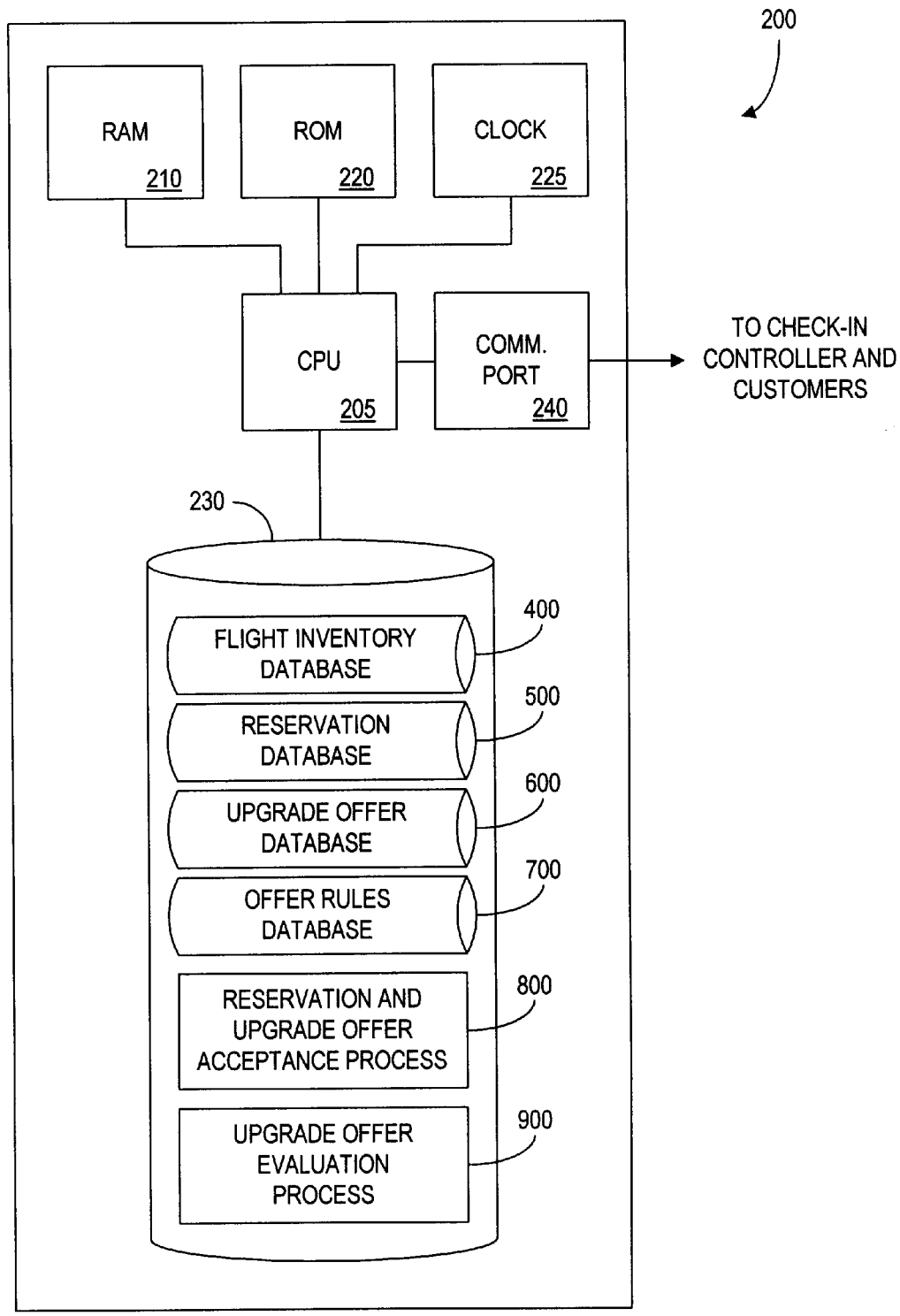
FIG. 2 is a schematic block diagram of the exemplary airline central controller of FIG. 1.

FIG. 2 is a block diagram showing the architecture of an illustrative airline central controller 200. The airline central controller 200 preferably includes certain standard hardware components, such as a central processing unit (CPU) 205, a random access memory (RAM) 210, a read only memory (ROM) 220, a clock 225, a data storage device 230, and a communications port 240. The CPU 205 is preferably linked to each of the other listed elements, either by means of a shared data bus, or dedicated connections, as shown in FIG. 2.

The CPU 205 may be embodied as a single commercially available processor, such as Intel's Pentium 100 MHz P54C microprocessor, Motorola's 120 MHz PowerPC 604 microprocessor or Sun Microsystems's 166 MHz UltraSPARC-I microprocessor. Alternatively, the CPU 205 may be embodied as a number of such processors operating in parallel.

The ROM 220 and/or data storage device 230 are operable to store one or more instructions, which the CPU 205 is operable to retrieve, interpret and execute. The CPU 205 preferably includes a control unit, an arithmetic logic unit (ALU), and a CPU local memory storage device, such as, for example, a stackable cache or a plurality of registers, in a known manner. The control unit is operable to retrieve instructions from the data storage device 230 or ROM 220. The ALU is operable to perform a plurality of operations needed to carry out instructions. The CPU local memory storage device is operable to provide high-speed storage used for storing temporary results and control information.

As discussed further below in conjunction with FIGS. 4 through 7, respectively, the data storage device 230 includes a flight inventory database 400, a reservation database 500, an upgrade offer database 600 and an offer rules database 700. The flight inventory database 400 stores information for each flight, preferably on a per seat basis. The reservation database 500 preferably stores information for each reservation, including status information for any upgrade offers made by the associated customer. The upgrade offer database 600 preferably contains information on each upgrade offer pending in the automated service upgrade acceptance system 100. The offer rules database 700 preferably stores the seller-defined rules for each upgrade offer item, such as a minimum offer price.

It is noted that the offer rules contain sensitive information, including price flexibility, which, if known to an airline's competitors or customers, could dramatically impact the airline's overall revenue structure. Thus, according to a feature of the present invention, the offer rules are preferably securely stored by the airline central controller 200, if necessary, to prevent one airline 130 from accessing, obtaining or altering the offer rules of another airline 130. In one embodiment, the airline central controller 200 utilizes computer security techniques, such as database access control mechanisms. In this manner, the integrity and confidentiality of the offer rules are maintained in the potentially hostile computing environment.

In addition, as shown in FIG. 2, the data storage device 230 includes a reservation and upgrade offer acceptance process 800 and an upgrade offer evaluation process 900, discussed further below in conjunction with FIGS. 8 and 9, respectively. Generally, the reservation and upgrade offer acceptance process 800 receives each reservation from a customer 110 or travel agent 120, and any associated offers for upgraded services. The upgrade offer evaluation process 900 is preferably executed within a predefined period, or at predefined intervals, before the departure of a given flight to determine which offers for upgraded services to accept.

The communication port 240 preferably connects the airline central controller 200 to the check-in controller 300, as well as to customer 110 and travel agent 120. The communications port 240 preferably includes multiple communication channels for simultaneously establishing a plurality of connections.

Figure 3:
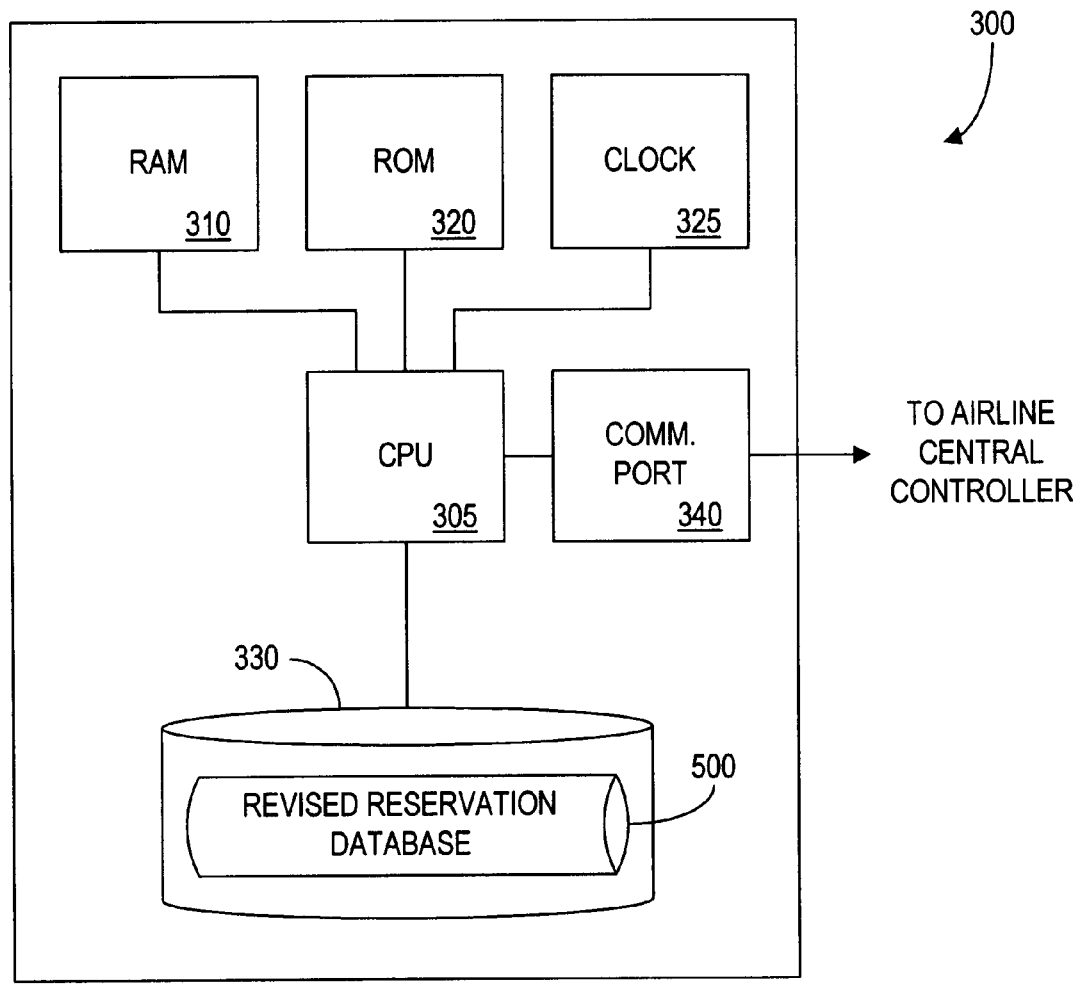
FIG. 3 is a schematic block diagram of the exemplary check-in controller of FIG. 1.

FIG. 3 is a block diagram showing the architecture of an illustrative check-in controller 300. The check-in controller 300 preferably includes certain standard hardware components, such as a central processing unit (CPU) 305, a random access memory (RAM) 310, a read only memory (ROM) 320, a clock 325, a data storage device 330, and a communications port 340. Each of these components may be identical to those described above in conjunction with FIG. 2.

The data storage device 330 preferably receives a revised copy 500' of the reservation database 500, which has been modified by the upgrade offer evaluation process 900, in a manner described below in conjunction with FIG. 9, to reflect new seats assignments for customers 110 who submitted an offer for one or more upgraded services which was accepted by the airline 130. In this manner, upon check-in or boarding, a customer 110 can be notified of any seating reassignments.

The communications port 340 connects the check-in controller 300 to the airline central controller 200. The communications port 340 preferably includes multiple communication channels for simultaneously establishing a plurality of connections.

FIG. 4 illustrates an exemplary flight inventory database 400 that stores information for each flight, preferably on a per seat basis. The flight inventory database 400 maintains a plurality of records, such as records 405–425, each associated with a different seat or seat type. For each seat, identified by seat number in field 455, the flight inventory database 400 includes the flight number, date of departure and aircraft type in fields 440, 445 and 450, respectively. In addition, the flight inventory database 400 preferably includes an indication of the seat class and a seat descriptor in fields 460 and 465, respectively.

Figure 5:
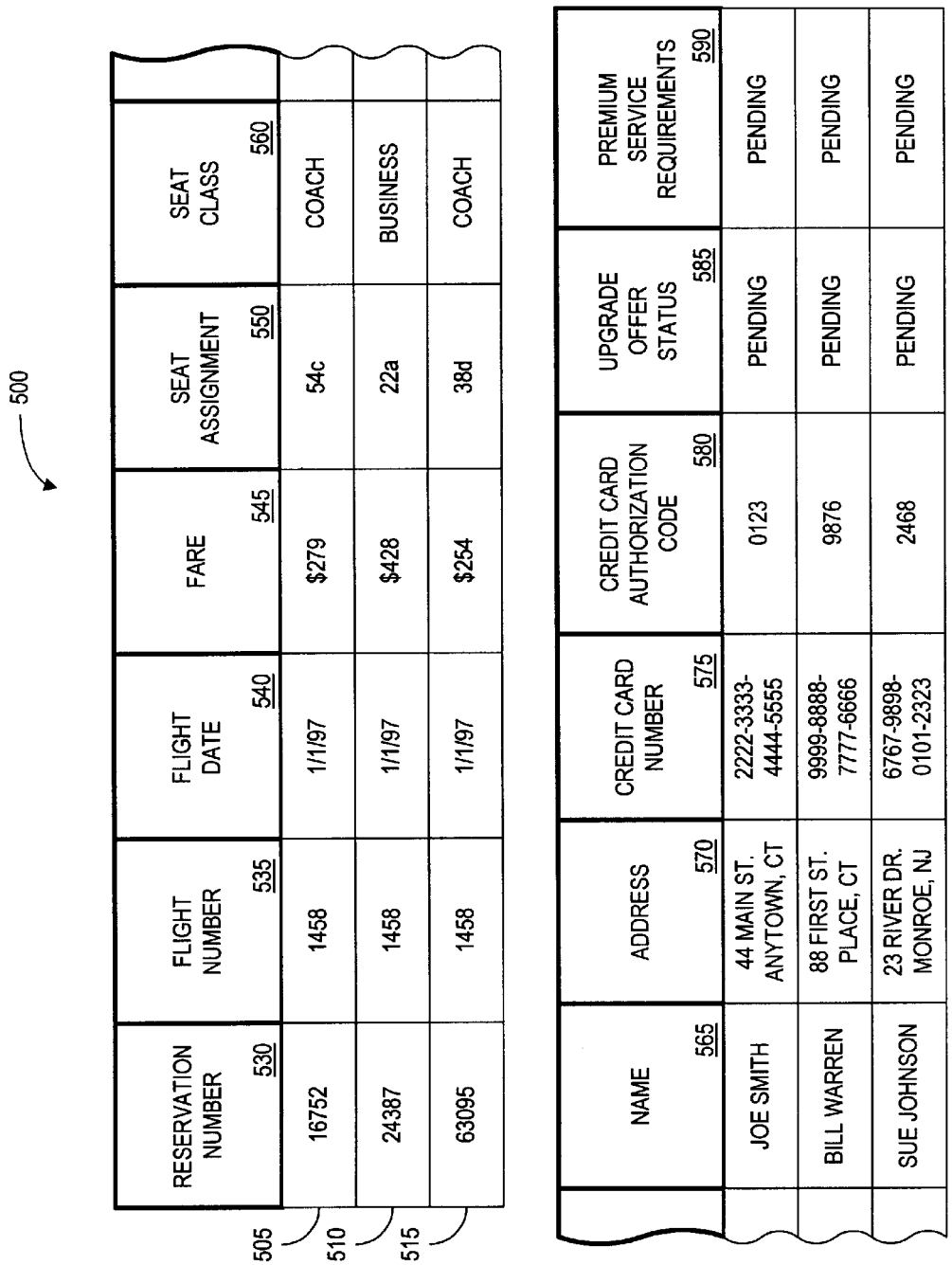
FIG. 5 illustrates a sample table from the reservation database of FIG. 2.

FIG. 5 illustrates an exemplary reservation database 500 that preferably stores information for each reservation, including status information for any upgrade offers made by the associated customer. The reservation database 500 maintains a plurality of records, such as records 505–515, each associated with a different reservation. For each reservation identified by reservation number in field 530, the reservation database 500 includes the flight number, departure date and associated fare in fields 535, 540 and 545, respectively. In addition, the reservation database 500 includes the seat assignment and seat class in fields 550 and 560, respectively. The reservation database 500 also includes personal information, such as the customer's name, address, and credit card number in fields 565 through 575, respectively. The credit card authorization code that is returned from the credit card issuer is preferably recorded in field 580. Finally, the reservation database 500 preferably records an indication of the status of any upgrade offers associated with each reservation in field 585 and an indication in field 590 of any premium services which the customer has successfully obtained as a result of an accepted offer for an upgraded service, such as a beverage immediately upon boarding, or priority delivery of luggage upon deplaning. It is noted that the reservation number recorded in field 530 can be utilized to access the associated upgrade offers recorded in the upgrade offer database 600.

FIG. 6 illustrates an upgrade offer database 600 that preferably stores information on each upgrade offer pending in the automated service upgrade acceptance system 100. The upgrade offer database 600 maintains a plurality of records, such as records 605–615, each associated with a different pending offer for an upgraded service. For each offer identified by the associated reservation number in field 650, the upgrade offer database 600 includes the flight number and departure date in fields 630 and 635, as well as the customer's name and address in fields 640 and 645. In addition, the upgrade offer database 600 includes the amount of each offer, the particular upgrade item(s) associated with the offer and the customer's indicated seat preference in fields 655 through 665, respectively.

FIG. 7 illustrates an exemplary offer rules database 700 that preferably stores the seller-defined rules for each upgrade offer item, such as a minimum offer price. The offer rules database 700 maintains a plurality of records, such as records 705–750, each associated with a different offer rule. For each offer rule identified by rule number in field 752, the offer rules database 700 includes the flight number, and associated date and time of departure in fields 755 through 765, respectively. In addition, the offer rules database 700 preferably includes an indication of the customer's current fare class, upgrade offer item and minimum offer amount, in fields 770 through 780, respectively. In this manner, for each upgrade offer item on a given flight, an airline can specify a minimum offer amount based on the customer's current fare class, or the fare differential.

Figure 8A:
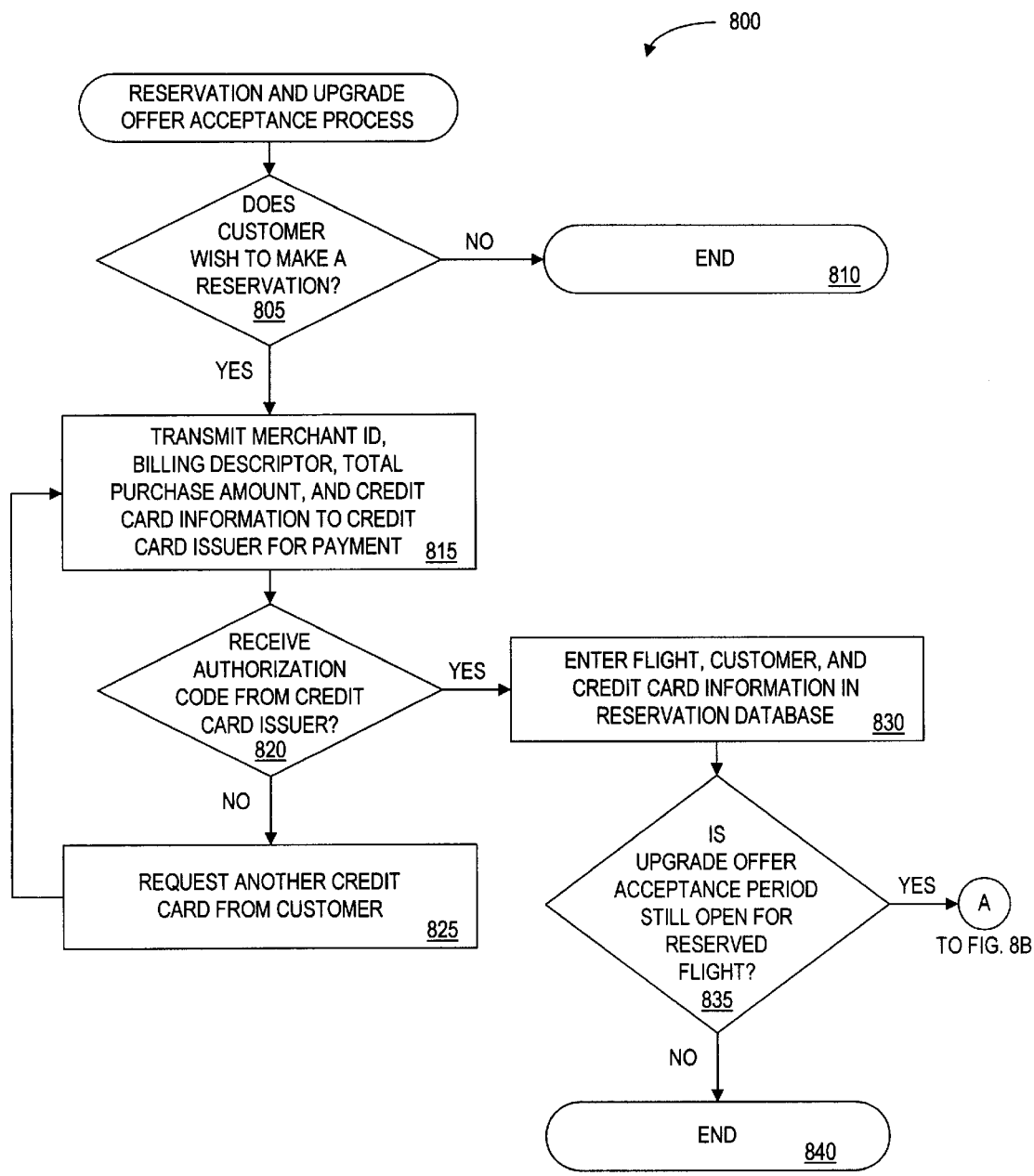
FIGS. 8a and 8b, collectively, are a flow chart describing an exemplary reservation and upgrade offer acceptance process implemented by the airline central controller of FIG. 2.
Figure 8B:
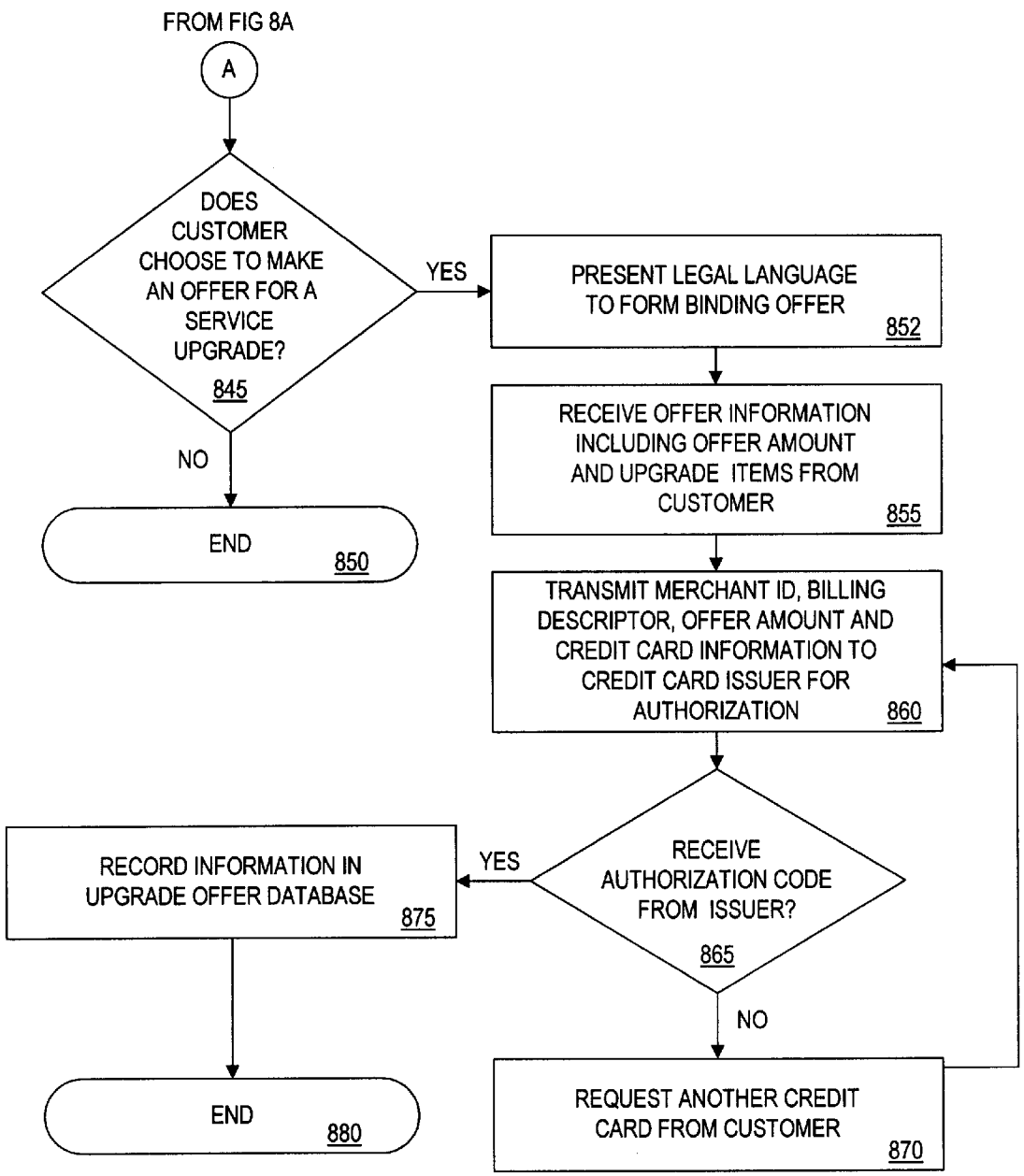

As previously indicated, the airline central controller 200 preferably executes a reservation and upgrade offer acceptance process 800, shown in FIGS. 8a and 8b, to receive each reservation from a customer 110, or from a travel agent 120 on behalf of a customer 110, and any associated offers for upgraded services. As shown in FIG. 8a, the reservation and upgrade offer acceptance process 800 is entered when a customer makes an inquiry regarding a travel itinerary.

A test is performed during step 805 to determine if the customer 110 wishes to make a reservation. If it is determined during step 805 that the customer 110 does not wish to make a reservation, then program control terminates during step 810. If, however, it is determined during step 805 that the customer 110 does wish to make a reservation, then the reservation and upgrade offer acceptance process 800 transmits the merchant identification number associated with the airline 130 or travel agent 120, together with an appropriate billing descriptor, total purchase amount, and credit card information during step 815 to the credit card issuer for payment of the amount of the reserved ticket.

Thereafter, a test is performed during step 820 to determine if an authorization code is received from the credit card issuer. If it is determined during step 820 that an authorization code is not received from the credit card issuer, then another credit card is requested from the customer 110 during step 825 and program control returns to step 815 and continues in the manner described above. If, however, it is determined during step 820 that an authorization code is received from the credit card issuer, then the flight, customer and credit card information, including the received authorization code, is entered into the reservation database 500 during step 830.

A test is performed during step 835 to determine if the upgrade offer acceptance period is still open for the reserved flight. If it is determined during step 835 that the upgrade offer acceptance period is not still open for the reserved flight, then program control terminates during step 840. If, however, it is determined during step 835 that the upgrade offer acceptance period is still open for the reserved flight, then program control continues to step 845 (FIG. 8b), where a test is performed to determine if the customer 110 wishes to make an offer for one or more upgraded services. If it is determined during step 845 that the customer 110 does not wish to make an offer for one or more upgraded services, then program control terminates during step 850.

If, however, it is determined during step 845 that the customer 110 wishes to make an offer for one or more upgraded services, then appropriate legal language is preferably displayed or read to the customer 110 during step 852, and the automated service upgrade acceptance system 100 waits for an acknowledgment from the customer 110 to form a binding offer. Thereafter, the offer information is received from the customer 110 during step 855, including the amount of the offer and an indication of the desired upgrade item(s).

The reservation and upgrade offer acceptance process 800 then transmits the merchant identification number associated with the airline 130 or travel agent 120, together with an appropriate billing descriptor, total offer amount, and credit card information during step 860 to the credit card issuer for authorization for the offer amount. Thereafter, a test is performed during step 865 to determine if an authorization code is received from the credit card issuer. If it is determined during step 865 that an authorization code is not received from the credit card issuer, then another credit card is requested from the customer 110 during step 870 and program control returns to step 860 and continues in the manner described above. If, however, it is determined during step 865 that an authorization code is received from the credit card issuer, then the offer information is then recorded in the upgrade offer database 600 during step 875. Program control then terminates during step 880.

Figure 9:
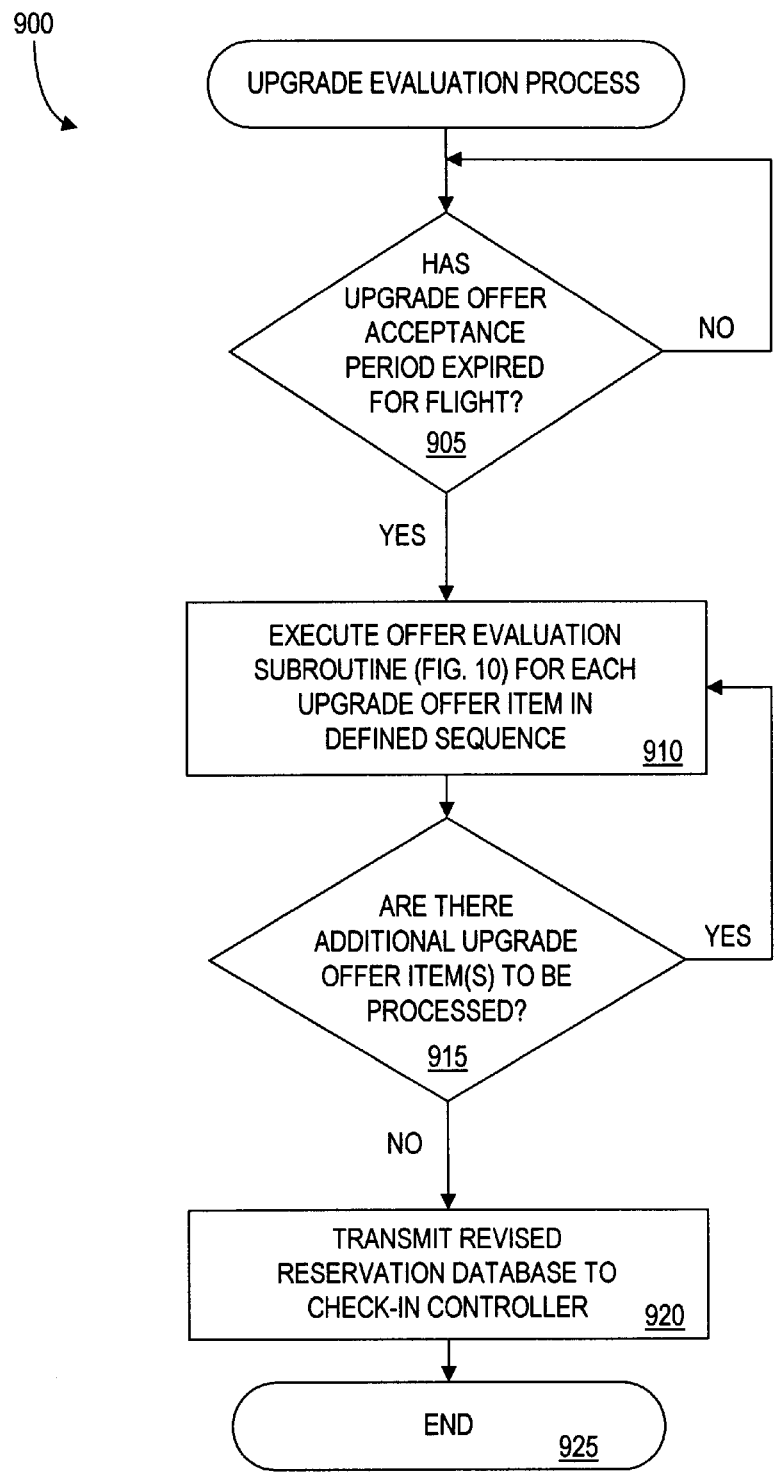
FIG. 9 is a flowchart describing an exemplary upgrade offer evaluation process implemented by the airline central controller of FIG. 2.

As discussed above, the airline central controller 200 preferably executes an upgrade offer evaluation process 900, shown in FIG. 9, at a predefined period, or at predefined intervals, before the departure of a given flight to determine which upgrade offers to accept. As shown in FIG. 9, the upgrade offer evaluation process 900 initially performs a test during step 905 to determine if the upgrade offer acceptance period has expired for a given flight. If it is determined during step 905 that the upgrade offer acceptance period has not expired for a given flight, then program control returns to step 905 to await the close of the upgrade offer acceptance period.

If, however, it is determined during step 905 that the upgrade offer acceptance period has expired for a given flight, then program control proceeds to step 910, where an offer evaluation subroutine 1000 (FIG. 10) is executed for each upgrade offer item in a defined sequence. As previously indicated, the received offers for each different upgrade offer item are processed in a predefined sequence, such that offers for the highest categories of seating are processed first. In this manner, seats in subsequent categories of seating will thus become available in sequence for further reassignment. As discussed further below, the illustrative offer evaluation subroutine 1000 initially evaluates the availability of the upgrade offer item being processed, and then accepts the highest offers, to the extent of the identified availability, provided that the offers exceed the seller-defined minimum offer amount.

After program control returns from the offer evaluation subroutine 1000, a test is performed during step 915 to determine if there are additional upgrade offer item(s) to be processed. If it is determined during step 915 that there are additional upgrade offer item(s) to be processed, then program control returns to step 910 and continue in the manner described above. If, however, it is determined during step 915 that there are no additional upgrade offer item(s) to be processed, then the revised reservation database 500' is transmitted to the check-in controller 300 during step 920. Program control then terminates during step 925.

Figure 10:
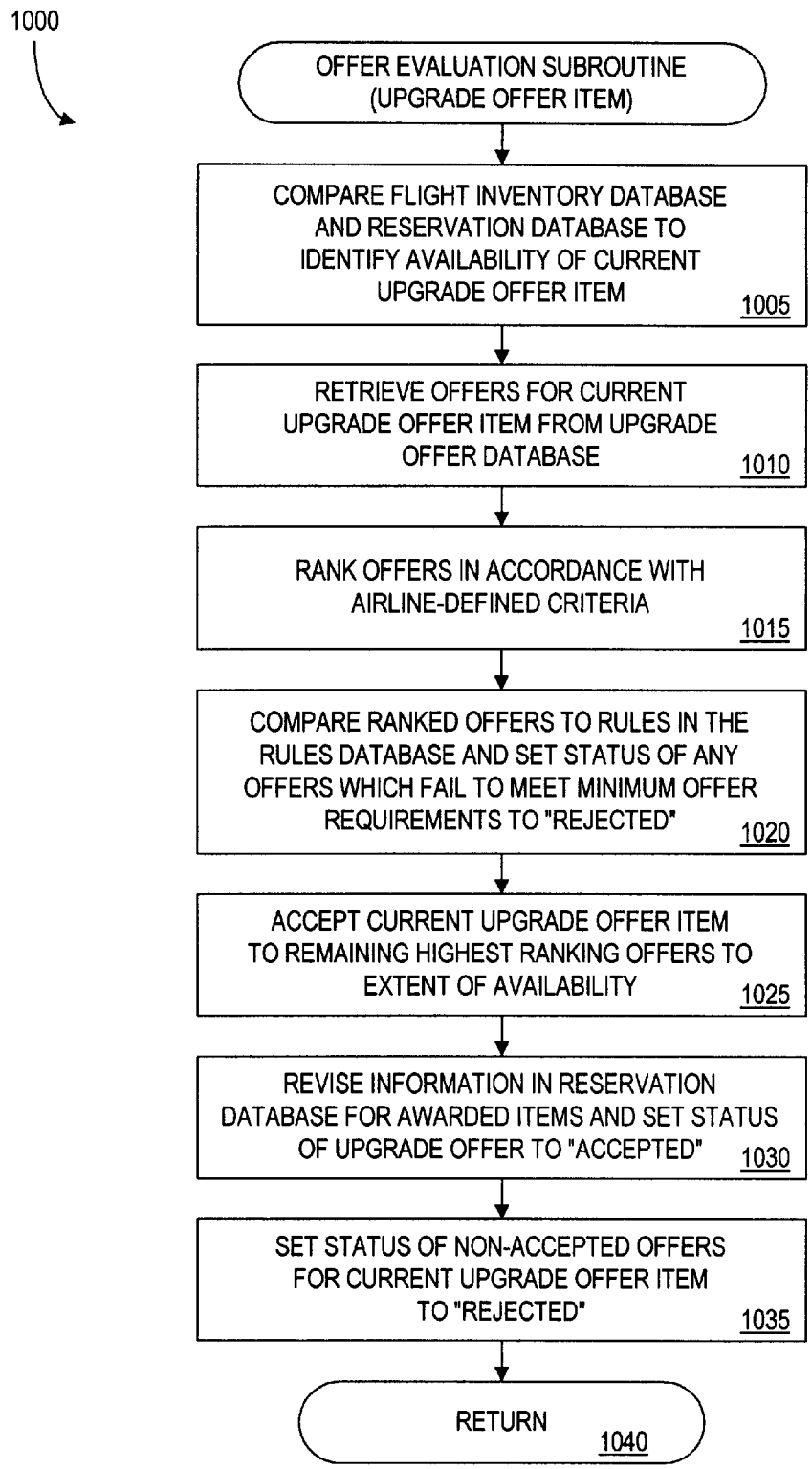
FIG. 10 is a flow chart describing an exemplary offer evaluation subroutine executed by the upgrade offer evaluation process of FIG. 9.

As previously indicated, the upgrade offer evaluation process 900 executes an offer evaluation subroutine 1000 for each upgrade offer item in a defined sequence. Thus, as shown in FIG. 10, the offer evaluation subroutine 1000 initially compares the flight inventory database 400 and the reservation database 500 to identify the availability of the current upgrade offer item being processed by the offer evaluation subroutine 1000. Thereafter, the specific offers for the current upgrade offer item are retrieved during step 1010 from the upgrade offer database 600.

The specific offers retrieved during the previous step are then ranked during step 1015 in accordance with seller-defined criteria. As previously indicated, the automated service upgrade acceptance system 100 can enhance the value of offers in accordance with seller-defined criteria for preferred customers, such as frequent flyers, or in accordance with a promotional offer. The offer evaluation subroutine 1000 then compares the ranked offers during step 1020 to the offer rules stored in the offer rules database 700 and sets the status in the reservation database 500 of any offers which fail to meet the seller-defined minimum offer requirements to "rejected." The current upgrade offer item is then accepted for the remaining highest-ranking offers to the extent of the availability identified during step 1005.

The offer evaluation subroutine 1000 then modifies the information in the reservation database 500 during step 1030, to reflect new seat assignments, for accepted offers and sets the status of the accepted upgrade offers to "accepted." Finally, the status of non-accepted offers for the current upgrade offer item is set to "rejected" during step 1035 before program control terminates during step 1040.

It is to be understood that the embodiments and variations shown and described herein are merely illustrative of the principles of this invention and that various modifications may be implemented by those skilled in the art without departing from the scope and spirit of the invention.

For example, as previously indicated, although the present invention has been illustrated in an airline environment, the automated service upgrade acceptance system 100 could be utilized to offer upgrading services, such as car washing and dry cleaning as well as other services for any venue or event having assigned seating within different categories of seats, as would be apparent to a person of ordinary skill.

We claim:

1. A method for processing reservations for a selected category of assigned service, said method comprising the steps of:

receiving a reservation from a customer for said selected category of service at a specified price from among a plurality of service categories;

receiving an offer from said customer for a change of said selected category of service to a preferred category of service at a price defined by said customer;

evaluating said offer based on predefined offer acceptance criteria; and indicating said offer as acceptable if said offer meets said predefined offer acceptance criteria.

2. The method of claim 1 further comprising the step of providing a notification of a service reassignment if said offer is accepted.

3. The method of claim 1 wherein said predefined offer acceptance criteria includes an availability of said preferred category of service.

4. A method for processing reservations for a selected category of assigned service, said method comprising the steps of:

receiving a reservation from a customer for said selected category of service at a specified price from among a plurality of service categories;

receiving an offer from said customer for a change of said selected category of service to a preferred category of service at a price;

evaluating said offer based on predefined offer acceptance criteria, wherein said predefined offer acceptance criteria includes minimum acceptable prices; and indicating said offer as acceptable if said offer meets said predefined offer acceptance criteria.

5. The method of claim 1 wherein said predefined offer acceptance criteria includes forecasted demand for said preferred category of service.

6. The method of claim 1 wherein said selected category of service is an assigned seat category.

7. The method of claim 1 further comprising the step of receiving a guarantee of payment for said reservation.

8. The method of claim 1 further comprising the step of receiving a guarantee of payment for said offer.

9. The method of claim 1 further comprising the step of providing an acceptance or rejection of said offer upon checking in to receive said selected category of service.

10. The method of claim 1 wherein said evaluating step includes determining an availability of the preferred category of service.

11. The method of claim 1 wherein said offer is weighted in accordance with seller-defined criteria.

12. A method of processing reservations for a selected category of service, said method comprising the steps of:

receiving a reservation from a customer for a selected category of service;

receiving an offer from said customer for an upgraded service associated with said selected category of service at a price defined by said customer;

evaluating said offer based on predefined offer acceptance criteria; and treating said offer as acceptable if said offer meets said predefined offer acceptance criteria.

13. A method of processing reservations for a selected category of service, said method comprising the steps of:

receiving a reservation from a customer for a selected category of service;

receiving an offer from said customer for an upgraded service associated with said selected category of service;

evaluating said offer based on predefined offer acceptance criteria, wherein said predefined offer acceptance criteria includes minimum acceptable prices; and treating said offer as acceptable if said offer meets said predefined offer acceptance criteria.

14. The method of claim 12 wherein said predefined offer acceptance criteria includes forecasted demand for said upgraded service.

15. The method of claim 12 further comprising the step of receiving a guarantee of payment for said reservation.

16. The method of claim 12 further comprising the step of receiving a guarantee of payment for said offer.

17. The method of claim 12 further comprising the step of providing an acceptance or rejection of said offer upon checking in to said selected category of service.

18. The method of claim 12 wherein said evaluating step includes determining an availability of the upgraded service.

19. The method of claim 12 wherein said offer is weighted in accordance with seller-defined criteria.

20. A method for processing reservations for a selected category of assigned service, said method comprising the steps of:

receiving an offer from an individual having a reservation for a selected category of service for a change of said selected category of service to a preferred category of service at a particular price defined by said individual;

evaluating said offer based on predefined offer acceptance criteria; and accepting said offer if said offer meets said predefined offer acceptance criteria.

21. The method of claim 20 further comprising the step of providing a notification of a service reassignment if said offer is accepted.

22. The method of claim 20 wherein said predefined offer acceptance criteria includes an availability of said preferred category of service.

23. A method for processing reservations for a selected category of assigned service, said method comprising the steps of:

receiving an offer from an individual having a reservation for a selected category of service for a change of said selected category of service to a preferred category of service at a particular price;

evaluating said offer based on predefined offer acceptance criteria, wherein said predefined offer acceptance criteria includes minimum acceptable prices; and accepting said offer if said offer meets said predefined offer acceptance criteria.

24. The method of claim 20 wherein said predefined offer acceptance criteria includes forecasted demand for said preferred category of service.

25. The method of claim 20 wherein said selected category of service is an assigned seat category.

26. The method of claim 20 further comprising the step of receiving a guarantee of payment for said offer.

27. The method of claim 20 further comprising the step of providing an acceptance or rejection of said offer upon checking in to receive said selected category of service.

28. The method of claim 20 wherein said evaluating step includes determining an availability of the preferred category of service.

29. The method of claim 20 wherein said offer is weighted in accordance with seller-defined criteria.

30. A reservation system comprising:

means for receiving a reservation from a customer for a selected category of service at a specified price from among a plurality of service categories;

means for receiving an offer from said customer for an upgrade of said selected category of service to a preferred category of service at an incremental price defined by said customer;

means for evaluating at a predetermined time said offer based on predefined offer acceptance criteria; and means for indicating that said offer is acceptable if said offer satisfies said predefined offer acceptance criteria.

31. The reservation system of claim 30 further comprising means for providing a notification of a service reassignment if said offer is accepted.

32. The reservation system of claim 30 wherein said predefined offer acceptance criteria includes an availability of said preferred category of service.

33. A reservation system comprising:

means for receiving a reservation from a customer for a selected category of service at a specified price from among a plurality of service categories;

means for receiving an offer from said customer for an upgrade of said selected category of service to a preferred category of service at an incremental price;

means for evaluating at a predetermined time said offer based on predefined offer acceptance criteria, wherein said predefined offer acceptance criteria includes minimum acceptable prices; and means for indicating that said offer is acceptable if said offer satisfies said predefined offer acceptance criteria.

34. The reservation system of claim 30 wherein said predefined offer acceptance criteria includes forecasted demand for said preferred category of service.

35. The reservation system of claim 30 wherein said selected category of service is an assigned seat category.

36. The reservation system of claim 30 further comprising means for receiving a guarantee of payment for said reservation.

37. The reservation system of claim 30 further comprising means for receiving a guarantee of payment for said offer.

38. The reservation system of claim 30 further comprising means for providing an acceptance or rejection of said offer upon checking in to receive said selected category of service.

39. An offer processing system comprising:
   means for receiving an offer from an individual having a reservation for a selected category of service for a change of said selected category of service to a preferred category of service at a particular price defined by said individual;
   means of evaluating said offer based on predefined offer acceptance criteria; and
   means for indicating that said offer is acceptable if said offer meets said predefined offer acceptance criteria.

40. The offer processing system of claim 39 further comprising means for providing a notification of a service reassignment if said offer is accepted.

41. The offer processing system of claim 39 wherein said predefined offer acceptance criteria includes an availability of said preferred category of service.

42. An offer processing system comprising:
   means for receiving an offer from an individual having a reservation for a selected category of service for a change of said selected category of service to a preferred category of service at a particular price;
   means of evaluating said offer based on predefined offer acceptance criteria, wherein said predefined offer acceptance criteria includes minimum acceptable prices; and
   means for indicating that said offer is acceptable if said offer meets said predefined offer acceptance criteria.

43. The offer processing system of claim 39 wherein said predefined offer acceptance criteria includes forecasted demand for said preferred category of service.

44. The offer processing system of claim 39 wherein said selected category of service is an assigned seat category.

45. The offer processing system of claim 39 further comprising means for receiving a guarantee of payment for said offer.

46. The offer processing system of claim 39 further comprising means for providing an acceptance or rejection of said offer upon checking in to receive said selected category of service.

47. A method of obtaining a service from amongst a plurality of service categories, said method comprising the steps of:
   obtaining a reservation from a customer for a selected category of service from amongst a plurality of categories of services at a specified price;
   receiving an offer from said customer for an upgrade of said selected category of service to a preferred category of service at a price defined by said customer; and
   indicating that said offer is acceptable if said offer meets said predefined offer acceptance criteria.

48. The method of claim 47 further comprising the step of receiving a notification of a service reassignment if said offer is accepted.

49. The method of claim 47 wherein said selected category of service is an assigned seat category.

50. The method of claim 47 further comprising the step of providing a guarantee of payment for said reservation.

51. The method of claim 47 further comprising the step of providing a guarantee of payment for said offer.

52. The method of claim 47 further comprising the step of receiving an acceptance or rejection of said offer upon checking in to receive said selected category of service.

53. A method of obtaining an upgraded service from amongst a plurality of services, said method comprising the steps of:
   obtaining a reservation from a customer for a selected category of service;
   receiving an offer from said customer of an upgraded service associated with said selected category of service at a price defined by said customer; and
   accepting said offer if said offer meets said predefined offer acceptance criteria.

54. The method of claim 53 wherein said selected category of service is an assigned seat category.

55. The method of claim 53 further comprising the step of providing a guarantee of payment for said reservation.

56. The method of claim 53 further comprising the step of providing a guarantee of payment for said offer.

57. The method of claim 53 further comprising the step of receiving an acceptance or rejection of said offer upon checking in to receive said selected category of service.

58. An article of manufacture comprising:
   a computer readable medium having computer readable code means embodied thereon, said computer readable code means comprising:
   a step to receive a reservation from a customer for a selected category of service at a specified price from among a plurality of service categories;
   a step to receive an offer from said customer for a change of said selected category of service to a preferred category of service at a price defined by said customer;
   a step to determine at a predetermined time the availability of services in said preferred category of service;
   a step to evaluate said offer based on predefined offer acceptance criteria; and
   a step to indicate whether said offer is acceptable.

59. An article of manufacture comprising:
   a computer readable medium having computer readable code means embodied thereon, said computer readable code means comprising:
   a step to receive an offer from an individual having a reservation for a selected category of service for a change of said selected category of service to a preferred category of service at a particular price defined by said individual;
   a step to determine at a predetermined time the availability of services in said preferred category of service;
   a step to evaluate said offer based on predefined offer acceptance criteria; and
   a step to designate said offer is acceptable.

60. An article of manufacture comprising:
   a computer readable medium having computer readable code means embodied thereon, said computer readable code means comprising:
   a step to receive a reservation from a customer for a selected category of service;
   a step to receive an offer from said customer for an upgraded service associated with said selected category of service at a price defined by said customer;
   a step to evaluate said offer based on predefined offer acceptance criteria; and
   a step to accept said offer if said offer meets said predefined offer acceptance criteria.

61. A method for processing reservations for a selected category of assigned service, said method comprising the steps of:

receiving an offer from an individual having a reservation for a selected category of service for a change of said selected category of service to a preferred category of service at a particular price defined by said individual;

providing said offer to a provider of said service for evaluating said offer based on predefined offer acceptance criteria; and indicating said offer as acceptable if said offer meets said predefined offer acceptance criteria.

62. The method of claim 61 further comprising the step of providing a notification of a service reassignment if said offer is accepted.

63. The method of claim 61 wherein said predefined offer acceptance criteria includes the availability of said preferred category of service.

64. A method for processing reservations for a selected category of assigned service, said method comprising the steps of:

receiving an offer from an individual having a reservation for a selected category of service for a change of said selected category of service to a preferred category of service at a particular price;

providing said offer to a provider of said service for evaluating said offer based on predefined offer acceptance criteria, wherein said predefined offer acceptance criteria includes minimum acceptable prices; and indicating said offer as acceptable if said offer meets said predefined offer acceptance criteria.

65. The method of claim 61 wherein said predefined offer acceptance criteria includes forecasted demand for said preferred category of service.

66. The method of claim 61 wherein said selected category of service is an assigned seat category.

67. The method of claim 61 further comprising the step of receiving a guarantee of payment for said offer.

68. The method of claim 61 further comprising the step of providing an acceptance or rejection of said offer upon checking in to receive said selected category of service.

69. The method of claim 61 wherein said evaluating step includes determining the availability of the preferred category of service.

70. The method of claim 61 wherein said offer is weighted in accordance with seller-defined criteria.

71. A method for processing reservations for a selected category of assigned service, said method comprising the steps of:

receiving a reservation from a customer for said selected category of service at a specified price from among a plurality of service categories;

receiving an offer from said customer for a change of said selected category of service to a preferred category of service at a price;

evaluating said offer based on predefined offer acceptance criteria wherein said step of evaluating said offer further comprises the substep of determining if an offer acceptance period has expired; and indicating said offer as acceptable if said offer meets said predefined offer acceptance criteria.

72. A method of processing reservations for a selected category of service, said method comprising the steps of:

receiving a reservation from a customer for a selected category of service;

receiving an offer from said customer for an upgraded service associated with said selected category of service;

evaluating said offer based on predefined offer acceptance criteria, wherein said step of evaluating said offer further comprises the substep of determining if an offer acceptance period has expired; and treating said offer as acceptable if said offer meets said predefined offer acceptance criteria.

73. A reservation system comprising:

means for receiving a reservation from a customer for a selected category of service at a specified price from among a plurality of service categories;

means for receiving an offer from said customer for an upgrade of said selected category of service to a preferred category of service at an incremental price;

means for evaluating at a predetermined time said offer based on predefined offer acceptance criteria, wherein said means for evaluating further comprises means for determining if an offer acceptance period has expired; and means for indicating that said offer is acceptable if said offer satisfies said predefined offer acceptance criteria.

74. An article of manufacture comprising:

a computer readable medium having computer readable code means embodied thereon, said computer readable code means comprising:

a step to receive a reservation from a customer for a selected category of service at a specified price from among a plurality of service categories;

a step to receive an offer from said customer for a change of said selected category of service to a preferred category of service at a price;

a step to determine at a predetermined time the availability of services in said preferred category of service;

a step to evaluate said offer based on predefined offer acceptance criteria, wherein said step to evaluate further comprises a substep to determine if an offer acceptance period has expired; and a step to indicate whether said offer is acceptable.

75. The method of claim 1, wherein said predefined offer acceptance criteria includes minimum acceptable prices.

76. The method of claim 12, wherein said predefined offer acceptance criteria includes minimum acceptable prices.

77. The method of claim 20, wherein said predefined offer acceptance criteria includes minimum acceptable prices.

78. The reservation system of claim 30, wherein said predefined offer acceptance criteria includes minimum acceptable prices.

79. The offer processing system of claim 39, wherein said predefined offer acceptance criteria includes minimum acceptable prices.

80. The method of claim 61, wherein said predefined offer acceptance criteria includes minimum acceptable prices.

81. The method of claim 1, wherein said step of evaluating said offer further comprises the substep of determining if an offer acceptance period has expired.

82. The method of claim 12, wherein said step of evaluating said offer further comprises the substep of determining if an offer acceptance period has expired.

83. The system of claim 30, wherein said means for evaluating further comprises means for determining if an offer acceptance period has expired.

84. The article of manufacture of claim 58, wherein said step to evaluate further comprises a substep to determine if an offer acceptance period has expired.

* * * * *